April 8, 1969      W. T. HILL      3,437,160
WEIGHING SYSTEM
Filed Feb. 3, 1966
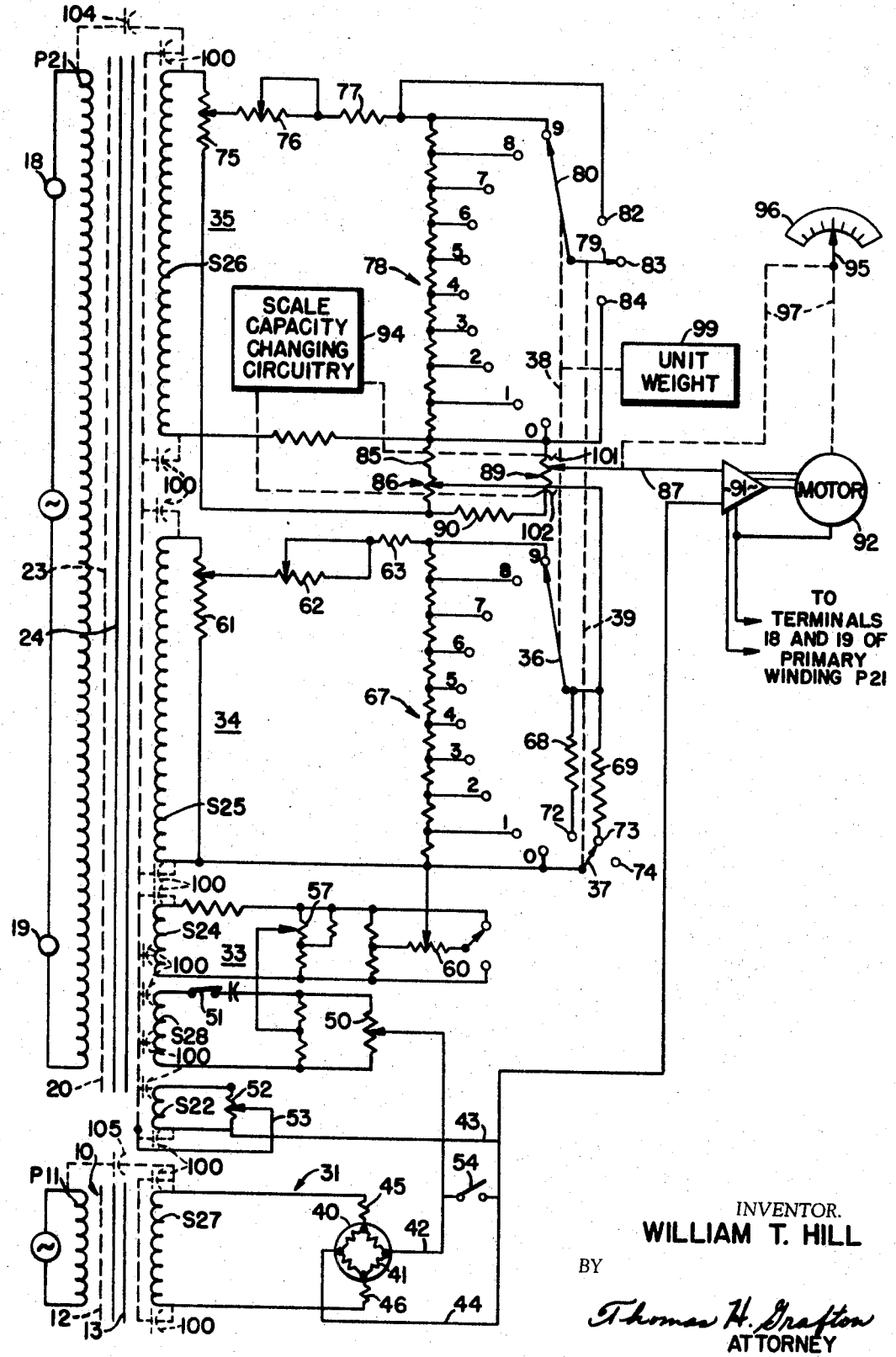
INVENTOR.
WILLIAM T. HILL
BY
Thomas H. Grafton
ATTORNEY

United States Patent Office 3,437,160
Patented Apr. 8, 1969

3,437,160
WEIGHING SYSTEM
William T. Hill, Toledo, Ohio, assignor, by mesne assignments, to The Reliance Electric and Engineering Company, Toledo, Ohio, a corporation of Ohio
Filed Feb. 3, 1966, Ser. No. 524,916
Int. Cl. G01g 3/14
U.S. Cl. 177—211                                   3 Claims

ABSTRACT OF THE DISCLOSURE

An electronic weighing scale having a servo balance circuit in which there is an inherent, unwanted quadrature signal. Part of the quadrature signal is canceled by an out of phase quadrature voltage and part of the quadrature signal is neutralized by an in phase voltage to avoid saturation of the servo's amplifier.

---

This invention relates to servo balance circuits and in particular to new techniques for neutralizing quadrature components in voltages produced in servo balance circuits.

In the load cell weighing scale disclosed in U.S. Patent No. 3,221,829 issued Dec. 7, 1965, in the name of Robert D. Kohler, a servo balance circuit is energized by a power transformer having primary and secondary winding means and shield means for the secondary winding means. The shield means is capacitively coupled to the secondary winding means which produces a quadrature signal in the balance circuit. Phase shift in the load cell output voltage also adds a quadrature component. A quadrature adjust potentiometer produces a voltage which cancels these quadrature signals. However, when circuit components are not chosen with care, e.g., uniform components from one installation to another, or when relatively high voltages are used, the prior quadrature adjust potentiometer cannot take care of the unwanted quadrature signals satisfactorily. It is believed, despite the use of the shielding, that capacitive coupling exists between the primary and secondary winding means and that this coupling produces a quadrature signal which the prior quadrature adjust potentiometer cannot take care of under such circumstances.

The objects of this invention are to improve servo balance circuits, to provide new techniques for neutralizing quadrature signals produced in servo balance circuits, and to improve electrical and electronic weighing scales.

One embodiment of this invention enabling the realization of these objects is a servo balance circuit which is shown in the above U.S. Patent No. 3,221,829 modified as follows: Two switches are added to selectively isolate the quadrature adjust potentiometer and the load cell shown in the patent from the balance circuit and an additional quadrature adjust potentiometer also is added. The added quadrature adjust potentiometer has its slider in circuit with the shield means in the power transformer which supplies alternating current to the balance circuit. When the old quadrature adjust potentiometer and the load cell are isolated, the new quadrature adjust potentiometer is adjusted to produce a quadrature voltage which neutralizes the quadrature signal due to capacitive coupling between the primary and secondaries of the power transformer. Then the two switches are operated to add the old quadrature adjust potentiometer and the load cell to the balance circuit and the old quadrature adjust potentiometer is adjusted as described in the patent.

The above and other objects and features of this invention will be appreciated more fully from the following detailed description when read with reference to the accompanying drawings wherein:

The figure is a schematic wiring diagram showing the essential components of an electronic weighing scale.

Referring to the drawing, a weighing scale system 31 employs strain gages 41 in a bridge circuit of a load cell 40 to generate a signal which is characteristic of a load. When energized from a secondary winding S27, a signal or output voltage which is a function of load upon the load cell 40 is generated across the leads 42 and 44. The load cell or transducer means for generating an output voltage proportional to load upon the scale is of conventional design. The weighing scale system may include a single load cell as shown or a plurality of load cells connected in series and includes the conventional mechanical elements normally associated therewith, which are not shown, such as a load receiver. The current and voltage supplied by the secondary winding S27 is maintained at the proper operating level by the resistors 45 and 46, the secondary winding S27 being part of a power transformer 10 which has its primary winding 11 connected to a source of alternating current, a shield 12 for the secondary winding S27 and a core 13.

The output voltage from the load cell 40 which is significant is the net change from the unloaded to the loaded condition and, therefore, the bridge is normally adjusted to be in balance with no voltage being developed across the leads 42 and 44 when the load receiver is unloaded. Thus the output voltage generated across the leads 42 and 44 ideally is zero with no load upon the system. In order to measure the load applied to the load cell, which results in a voltage differential being established between the leads 42 and 44, the lead 44 is connected to an amplifier and motor control device 91. The amplifier 91 functions as an error detector and furnishes a voltage which has a magnitude that varies in accordance with the difference between the output voltage from the load cell 40 and a balancing voltage from a potentiometer or adjustable means 89 and has a phase which is the same as the phase of the larger magnitude signal. The potentiometer 89 is part of a balance circuit and is in circuit with the load cell for supplying a balancing voltage in opposition to the output voltage of the load cell. The amplifier 91 controls a servo motor 92, the amplifier 91 and the servo motor 92 making up servo means which is in circuit with both the load cell and the potentiometer 89 for altering the potentiometer in a balancing direction in response to differences between the load cell output voltage and the potentiometer balancing voltage. The servo motor 92 positions an indicator 95 and the adjustable arm 87 of the potentiometer 89 through a mechanical connection 97. Accordingly, as the counterbalancing voltage is varied in a balancing direction, the amplifier 91 responds to position the adjustable arm 87 until a null voltage, which is the difference between the load cell voltage and the counterbalancing voltage, is reached. Additional counterbalancing voltage which is also in phase opposition with the load cell output voltage is generated by means of a quadrature adjust potentiometer 50, a zero adjust potentiometer 60, a multitapped scale capacity changing resistor 67 and a multitapped span resistor 78 by way of double-deck selector switches 38 and 39, and the potentiometer 89 in circuit with the conductor 42 as shown in figure. A potentiometer 61, connected across a secondary winding S25 supplies by way of its variable positionable arm, variable resistor 62 and fixed curve-shaping resistor 63 the operating potential for the multitapped range step resistor 67. Likewise, the correct voltage across the potentiometer 89 for the particular capacity and linearity function of load cell 40 is established by the multitapped resistor 78, connected across a secondary winding S26, a variable resistor 76, a fixed resistor 77, a fixed resistor 85 and a zero adjust potentiometer 86.

The network provides a straight line voltage function, a negative voltage function, or a positive voltage function in order to accommodate any of the three possible functions generated by the load cell as disclosed in the above U.S. Patent No. 3,221,829. A negative curve is obtained by a judicial choice of the resistance values between the taps of the multitapped resistor 67. On placing either a loading resistor 68 or a loading resistor 69 in circuit with the multitapped resistor 67, a positive voltage function or a linear voltage function will result. Specifically, terminal 72, which is selected if a positive load cell voltage curve is generated by the load cell, has one end of the resistor 68 connected thereto; terminal 73, which is selected when a linear responsive curve is generated by the load cell, has one end of the resistor 69 connected thereto; and finally a terminal 74, which is selected if a negative response curve is generated, has no resistance connected thereto. The other ends of the resistors 68 and 69 are joined together and returned to the common point connecting a switch arm 36 and the adjustable arm of the potentiometer 86. The selection of the positive, negative or zero resistance, which choice is determined by the linearity function of the response curve of the load cell, is made by the manual positioning of a deck 37 of a double-deck switch 39.

The quadrature adjust potentiometer 50, connected in circuit with a secondary winding S28 as shown in the figure, introduces a quadrature voltage to cancel quadrature signal in the balance circuit caused by phase shift in the load cell signal and that due to capacitive coupling between a transformer shield 23 and transformer secondaries S22, S24, S25, S26 and S28 and between the transformer shield 13 and the secondary winding S27. The capacitive coupling is represented by the capacitors 100 shown in broken lines, i.e., the capacitors 100 per se are imaginary. A switch 51 functions to selectively isolate the quadrature adjust potentiometer 50 from the balance circuit. Zero adjust potentiometers 57 and 60, connected in circuit with a secondary winding S24 as shown in the figure, provide a voltage which is proportional to the system tare and 180 electrical degrees out-of-phase with the load cell output voltage to further reduce such output voltage. The secondary windings S22, S24, S25, S26 and S28 are a part of a power transformer 20 which has its primary winding P21 connected to a source of alternating current and the shield 23 for the secondary windings and a core 24.

The capacity changing resistor 67 has nine fixed taps which together with the potentiometer 89 form ten divisions or range steps over which the zero to full load capacity of the load cell is divided. A span potentiometer 75 is connected across the secondary winding S26. The tap of the span potentiometer 75 is connected in circuit with the potentiometer 76, the fixed resistor 77, the multitapped resistor 78, the fixed resistor 85, and the zero adjust potentiometer 86 across the potentiometer 75. The potentiometer 89 and a fixed resistor 90 form a series circuit across the resistor 85 and the zero adjust potentiometer 86. The multitapped resistor 78 and a deck 80 of the double-deck switch 38 insure that the potentiometer 89 has the correct voltage differential thereacross for the particular range step provided by the multitapped resistor 67 then in operation. As the tap setting of the resistor 67 is changed by the deck 36 of the double-deck switch 38, a corresponding change in the tap setting of the resistor 78 occurs. Automatic scale capacity changing circuitry 94, controlled by the operation of switches 101 and 102 that are closed by the arm 87 being driven to either its maximum or minimum voltage indicating position by the servo motor 92, drive the bidirectional switch 38 as disclose in the above U.S. Patent No. 3,221,829, and range step registering means 99 is provided as also shown in such patent to indicate the tap position of the switch 38 in terms of weight. The chart 96 indicates the position of the potentiometer arm 87 in terms of weight. To insure that the scale's potentiometer 89 has the correct voltage across it for different scale capacities as well as for the particular plus, minus or zero type of load cell being used, a second deck 79 has associated therewith contacts 82, 83, and 84 which respectively represent the plus, minus or zero type of load cell. Since the switch 79 is the second deck of the switch 39, the setting is in accordance with that of the switch 37. After it has been determined that the particular load cell being used is plus, minus or zero type, a single setting of the switch 39 is affected to set both of the switches 37 and 79 to the corresponding desired terminals.

A second quadrature adjust potentiometer 52 is arranged across the secondary winding S22 of the transformer 20 and has its positionable arm 53 connected to the shield 23 of such transformer 20 and its resistor portion connected, by means of a lead 43, to the load cell output lead 44 in circuit with the amplifier 91. A switch 54 across the leads 42 and 44 functions when closed to short out the load cell 40. When the quadrature adjust potentiometer 50 and the load cell 40 are isolated from the balance circuit by opening and closing switches 51 and 54, respectively, the quadrature adjust potentiometer arm 53 is adjusted until there is no quadrature signal in the output of the amplifier 91. This neutralizes quadrature signal circulating in the balance circuit. Then the switches 51 and 54 are closed and opened, respectively, to add the quadrature adjust potentiometer 50 and the load cell 40 to the balance circuit and the quadrature adjust potentiometer 50 is adjusted until again there is no quadrature signal in the output of the amplifier 91.

The power transformer 20 includes the primary winding means P21 and the secondary winding means S22, S24, S25, S26 and S28 with shield means 23 for the secondary winding means and is of conventional construction. Capacitive coupling between the primary and secondary winding means, represented by an imaginary capacitor 104 shown in broken lines (similar capacitive coupling 105 in transformer 10 which also is of conventional construction), produces a quadrature signal in the balance circuit. The quadrature adjust potentiometer 52, having its slider 53 in circuit with the shield means 23 of the transformer 20, produces a quadrature voltage which neutralizes the quadrature signal, i.e., the quadrature adjust means 52 drives the shield means 23 to neutralize the effect of the capacitive coupling between the primary and secondary windings. The second quadrature adjust means 50 is operable independently of the potentiometer 52 for producing a second quadrature voltage which cancels quadrature signal due principally to capacitive coupling between the shield means 12 and 23 and the respective secondaries S27 and S22, S24, S25, S26, and S28. Each of the secondaries S22, S24, S25, S26, S27 and S28 is a voltage generator with capacitive unbalance to ground producing quadrature components.

Having described the invention, I claim:

1. A weighing scale comprising, in combination, transducer means for generating an output voltage proportional to load upon the scale, adjustable means in circuit with the transducer means for supplying a balancing voltage in opposition to the output voltage, servo means in circuit with both said means for altering the adjustable means in a balancing direction in response to differences between said voltages, circuit means connecting the three means, power transformer means having primary and secondary winding means and shield means for the secondary winding means, the secondary winding means energizing the transducer means, the adjustable means and the servo means, operation of the scale producing a quadrature signal in the circuit means, and quadrature adjust means energized by energizing voltage from the secondary winding means and having adjustable means connected to the shield means producing a voltage which is in phase with said energizing voltage and which is applied to the shield means to partially neutralize the quadrature signal.

2. A weighing scale as claimed in claim 1 having a second quadrature adjust means energized by additional energizing voltage from the secondary winding means and having adjustable means connected to the transducer means producing a voltage which is out of phase with said additional energizing voltage and which cancels quadrature signal not neutralized by said in phase voltage.

3. A weighing scale as claimed in claim 2 having switch for coupling either one of the quadrature adjust means to the servo means independently of the other quadrature adjust means.

References Cited
UNITED STATES PATENTS

| | | | |
|---|---|---|---|
| 2,918,270 | 12/1959 | Golding | 177—211 |
| 3,031,609 | 4/1962 | Murphy | 336—69 |
| 3,081,830 | 3/1963 | Spademan | 177—211 |
| 3,221,829 | 12/1965 | Kohler | 177—211 |

RICHARD B. WILKINSON, *Primary Examiner.*

L. HAMBLEN, *Assistant Examiner.*

U.S. Cl. X.R.

336—69, 84